UNITED STATES PATENT OFFICE.

JOSEPH F. GENT, OF COLUMBUS, INDIANA.

PREPARING CEREALS.

SPECIFICATION forming part of Letters Patent No. 372,065, dated October 25, 1887.

Application filed January 11, 1887. Serial No. 224,055. (Specimens.)

*To all whom it may concern:*

Be it known that I, JOSEPH FRANKLIN GENT, a citizen of the United States, residing at Columbus, in the county of Bartholomew and State of Indiana, have invented certain new and useful Improvements in Preparing Cereals; and I do hereby declare the following to be a full, clear, and exact description of the invention, such as will enable others skilled in the art to which it appertains to make and use the same.

My present invention relates to the manufacture of flakes from the cereal known by the names of "corn," "maize," and "Indian corn," and is an improvement on the invention patented by me in Letters Patent No. 223,847, granted January 27, 1880.

My invention has for its object the more perfect breaking down and disintegration of the starch-cells and the more thorough intermixing and blending of the starchy particles and the gluten of which the material acted upon is mainly composed.

My present invention consists more particularly in certain changes in the third step of my said patented process, whereby the above-stated result is accomplished, and it is clearly set forth in the following description and particularly pointed out in the claims.

In my said patent I have described a mode of procedure for obtaining flakes of the cereal mentioned herein, consisting of three steps, the first step of which consists in the separation of the hulls and impurities from the kernels of corn by subjecting the corn to a dry chipping and cracking operation and by separating the hulls and impurities from the granulated portions. This step is the same in my present process, and may be accomplished in any desired manner which will effectually secure the result.

The second step described in my former patent consists in steaming the purified product of the first step for the purpose of softening and toughening the granules without cooking the same. This step is the same in my present process, and may be accomplished by any preferred means.

The third step of my present invention consists in subjecting the softened and toughened granules produced by the first and second steps to successive and progressive pressings, to thoroughly break down and disintegrate the starch-cells and to blend and mix together the starchy particles and the gluten of the said granules. In carrying out this portion of my present process the softened and toughened granules are first passed between heated rollers, reducing, compressing, and drying the granules a certain degree. The flattened granules or flakes are then subjected to the action of other rollers having a higher degree of heat, which rollers are set nearer together than the first, so that they are further compressed and heated. The granules or flakes are in this manner successively and progressively reduced and heated or dried until the desired result is accomplished.

It is to be understood that any equivalent apparatus may be employed in effecting this compression and reduction of the softened granules, and I do not desire to limit myself to the use of rollers in effecting such result.

The flaked product resulting from the operation of my process may, if found desirable or deemed expedient, be further dried before storing the same, and to insure the preservation of the product when stored.

The flaked product resulting from the operation of my process is readily distinguishable from the product of my former process by reason of the extreme attenuation of the flakes and the enlarged surfaces of the same.

The operation serves to completely break or rupture the starch-cells, and thoroughly mixes and commingles the gluten and starch particles, rendering the product more easily digested when used as food. The product is also more quickly and completely manipulated in other modes of treatment, thereby saving time in such processes, cheapening them, and rendering them more economical and profitable.

I do not limit myself to two sets of rollers or compressing devices, as I may employ three, four, five, six, or more, as may be found desirable; but each successive set of rollers or compressing devices shall be constructed to effect a greater degree of compression and apply a higher degree of heat.

What I claim, and desire to secure by Letters Patent, is—

1. The process of producing flaked cereals, consisting in, first, crushing or grinding the kernels in a dry state and separating the hulls and impurities therefrom; second, steaming the purified granular material, and third, in subjecting the steamed material to successive and progressive compression and heating, substantially as described.

2. As an improved article of manufacture, the herein-described product from corn, consisting of compressed attenuated flakes of purified corn material having large surfaces, for the purposes set forth.

In testimony whereof I affix my signature in presence of two witnesses.

JOSEPH F. GENT.

Witnesses:
E. T. WALKER,
L. B. WHITAKER.